United States Patent [19]
Downey

[11] Patent Number: 5,471,779
[45] Date of Patent: Dec. 5, 1995

[54] FISHING IMPLEMENT STORAGE APPARATUS

[76] Inventor: Edward Downey, 10610 Basson, Houston, Tex. 77025

[21] Appl. No.: 827,088

[22] Filed: Jan. 21, 1992

[51] Int. Cl.[6] .................................................. A01K 97/04
[52] U.S. Cl. ........................ 43/54.1; 206/315.11; 206/579
[58] Field of Search .................... 43/54.1, 57.1, 43/55, 56, 57; 206/315.11, 315.1, 579

[56] References Cited

U.S. PATENT DOCUMENTS

| | | | |
|---|---|---|---|
| 1,869,071 | 7/1932 | McLean | 43/55 |
| 2,153,549 | 4/1939 | Cooper | 43/54.1 |
| 2,800,741 | 7/1957 | Adams | 43/55 |
| 3,191,337 | 6/1965 | Fant | 43/57 |
| 3,603,019 | 9/1971 | Smeltze | 43/54.1 |
| 3,667,708 | 6/1972 | Smeltzer | 248/512 |
| 4,128,170 | 12/1978 | Elliott | 43/57.1 |
| 4,353,182 | 10/1982 | Junkas et al. | 43/55 |
| 4,750,287 | 6/1988 | Myers | 43/18.1 |

Primary Examiner—P. Austin Bradley
Assistant Examiner—Chuck Y. Mah
Attorney, Agent, or Firm—Kenneth D. Baugh

[57] ABSTRACT

A fishing implement storage apparatus 10 is provided. The fishing implement storage apparatus 10 includes a chest 12 having a seat and lid 24 pivotably coupled thereto. A handle 30 is pivotably coupled to the chest 12 to allow easy handling thereof. A storage compartment 32 for housing fishing accessories is coupled to the chest 12. The fishing implement storage apparatus 10 is also provided with an aerator 38 for oxygenating water 54 in the chest 12 so that live bait 56 can be stored therein. Additionally the fishing implement storage apparatus 10 is provided with a rod holder 60 to allow fishing without the fishing rod 70 being hand held by a user.

2 Claims, 2 Drawing Sheets

FISHING IMPLEMENT STORAGE APPARATUS

TECHNICAL FIELD

This invention relates to a fishing apparatus and more particularly to a fishing storage apparatus which allows a user to store and carry many, if not all, of his fishing implements in a single structure. The popularity of fishing as a sport and recreational endeavor makes proper equipment a serious and an ongoing concern. This concern for proper equipment when addressed by the serious fishermen will normally result in the fishermen carry a substantial number of individual fishing implements on the fishing trip. Of course all of this equipment is believed to be absolutely necessary for the fisherman's success. It is not at all unusual to find a fisherman carrying such necessities as rods and reels, stands to hold the rods and reels while fishing, chairs or stools for sitting, tackle boxes, containers to hold bait and coolers just to name some of the needed equipment. It is no doubt that having to carry and keep up with all of this equipment can be cumbersome and somewhat inconvenient. Not to mention that all of these individual implements can be expensive. A more expedient method of satisfying the fisherman's equipment needs is desirable.

Accordingly, a single inexpensive apparatus is desirable that will allow the fisherman to discord all of the individual equipment implements needed for fishing while still satisfying all the fisherman's equipment needs.

BACKGROUND OF THE ART

Attempts have been made to provide devices that will incorporate more than on fishing implement into a single structure. One such device is disclosed in U.S. Pat. No. 4,353,182. This device is a fishing box or tackle box. The device includes a seat, life preserver, fishing rod carrier, cooler, lid table tray, a flipout side table, a ruler for measuring the lengths of fish, a fish net holder, a towel rack and an accessory attachments for supporting an accessory such as a portable radio. Another arrangement is disclosed in U.S. Pat. No. 4,128,170. This device is a combination tackle box, bait holder, cooler and seat. This arrangement includes a generally cubical shaped insulated cooler with a plurality of latch means for securing thereto a combination of tackle box, bait well and seat means on the upper portion thereof and means for maintaining perishable bait.

Both these arrangements have realized some success.

Although these devices have a number of fishing implements some of which are common to both devices there is another concern. These devices still do not address what some fishermen believed to be the most pressing concern that is to have all the most necessary fishing implements in a single apparatus. There remains a need for such a device.

DISCLOSURE OF THE INVENTION

A Fishing Implement Storage Apparatus is provided. The fishing apparatus includes a chest having an open area formed therein and a handle pivotable coupled to the chest. A cover and supporting means is provided to open up and close the chest and provide a seat for a user. The fishing apparatus is also provided with a storage means coupled to the chest having an open area and a plurality of storage compartments formed therein. A means is coupled to the chest for supporting a fishing rod in a substantially upright position to allow continued fishing without the user holding the rod. The fishing apparatus is further provided with an oxygenating means for gathering and concentrating oxygen from outside the chest and then pumping the oxygen into the chest to oxygenate water in the chest and thereby keep bait alive inside the chest.

BRIEF DESCRIPTION OF THE DRAWING

The details of the invention will be described in connection with the accompanying drawing in which.

BEST MODE FOR CARRYING OUT THE INVENTION

Figure 1:
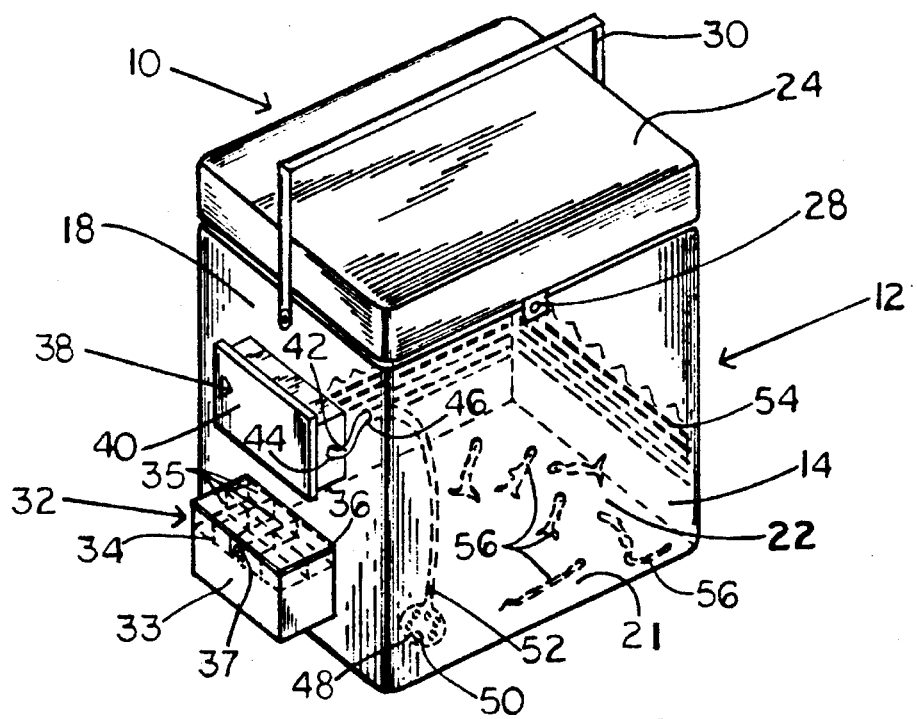
FIG. 1 is a perspective view illustrating a fishing implement storage apparatus in accordance with the principles of this invention.
Figure 2:
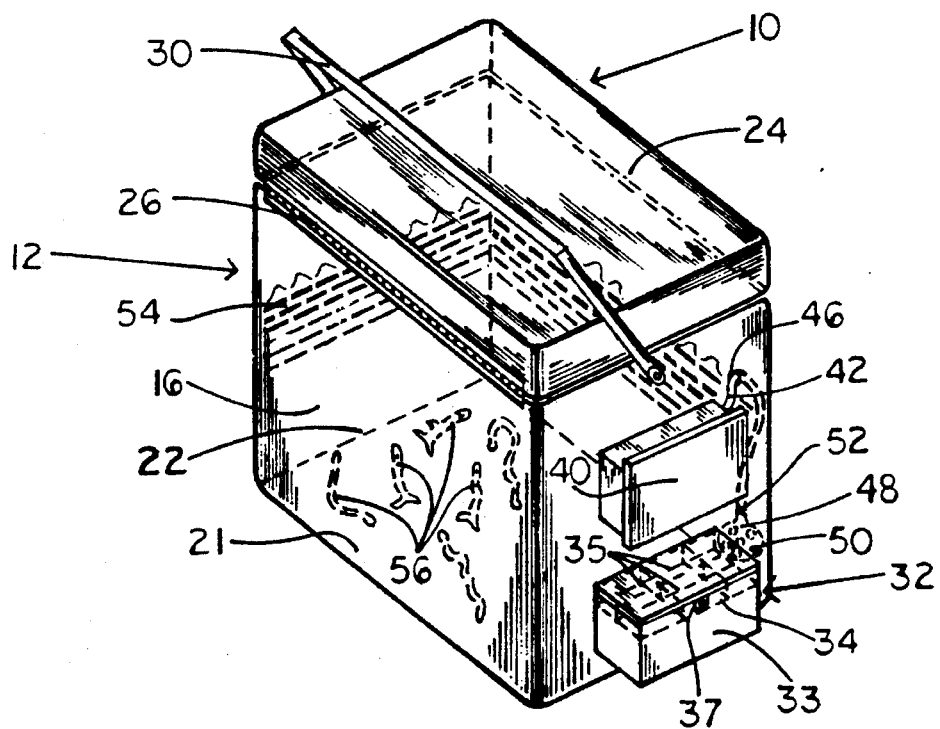
FIG. 2 is another perspective view illustrating the fishing implement storage apparatus in accordance with the principles of this invention.

Referring to FIGS. 1 and 2 there is shown a fishing implement storage apparatus generally designated by the numeral, 10. The fishing implement storage apparatus 10 includes a chest, generally designated, by the numeral, 12. The chest 12 is provided with front and back wall members 14 and 16 side wall members 18 and 20 and a bottom wall member 21. The wall members 14, 16, 18, 20 and 21 are coupled together to form an enclosure having an open area 22 formed therebetween. The chest 12 is also provided with a lid or top 24 which is pivotably coupled to an upper portion of the back wall member 16 by a coupling member 26.

The lid 24 is provided with a latch 28 which fastens the lid to the chest 12. The lid 24 serves as a cover for the chest 12 and a seat for a user when desired. The chest 12 is also provided with a handle 30 which is pivotably coupled to the side wall members 18 and 20 of the chest. The chest 12 may be formed of a lightweight hard plastic such as that used in the manufacture of coolers. Accordingly the chest 12 will have the qualities of a cooler or ice chest while also being of a nature to support the weight of a human being who wants to sit on the lid 24 while fishing.

The fishing implement storage apparatus 10 is also provided with a rectangular shaped storage compartment generally designated, by the numeral, 32. The storage compartment 32 is aligned and coupled to a lower portion of the side wall member 18 of the chest 12. The storage compartment 32 is provided with an open area 33 and a removable tray 34 having a plurality of compartments 35. The tray 34 rests in an upper portion of the storage compartment 32. The compartments 35 and open area 33 of the storage compartment 32 are used to house fishing implements such as hooks, line, tackle and other such fishing accessories that would be placed in a conventional tackle box. The storage compartment 32 may also be provided with a lid 36 to cover the contents of the storage compartment. The lid 36 is provided with a latch 37 which fastens the lid to the storage compartment 32.

The fishing implement storage apparatus 10 is also provided with an aerator, generally designated, by the numeral, 38. The primary functioning member 40 of the aerator 38 is coupled to the side wall member 18 of the chest 12. The aerator 38 is also provided with an airhose 42 which is coupled at one end 44 thereof to the primary functioning member 40 and extends into the open area 22 of the chest 12 through an aperture 46 in the side wall member 18 of the chest. The aerator 38 is also provided with an air dispenser, generally, designated by the numeral, 48 having a plurality of apertures 50 formed therein. The air dispenser 50 is coupled to an end 52 of the airhose 42 and rests on the bottom wall member 21 of the chest 12 in water 54 in the chest. The aerator 38 is a means for supplying oxygen to the water 54. That is a means for gathering and concentrating oxygen from outside the chest 12 and then pumping the oxygen into the chest to oxygenate the water 54. By oxygenating the water 54 bait 56 in the chest 12 can be kept alive until needed by the fisherman. The aerator 38 is a self contained unit which utilizes a 1.5 volt battery and may for example be a standard commonly used aerator having dimensions 3 by 1½ by 5 inches aerator.

Figure 3:
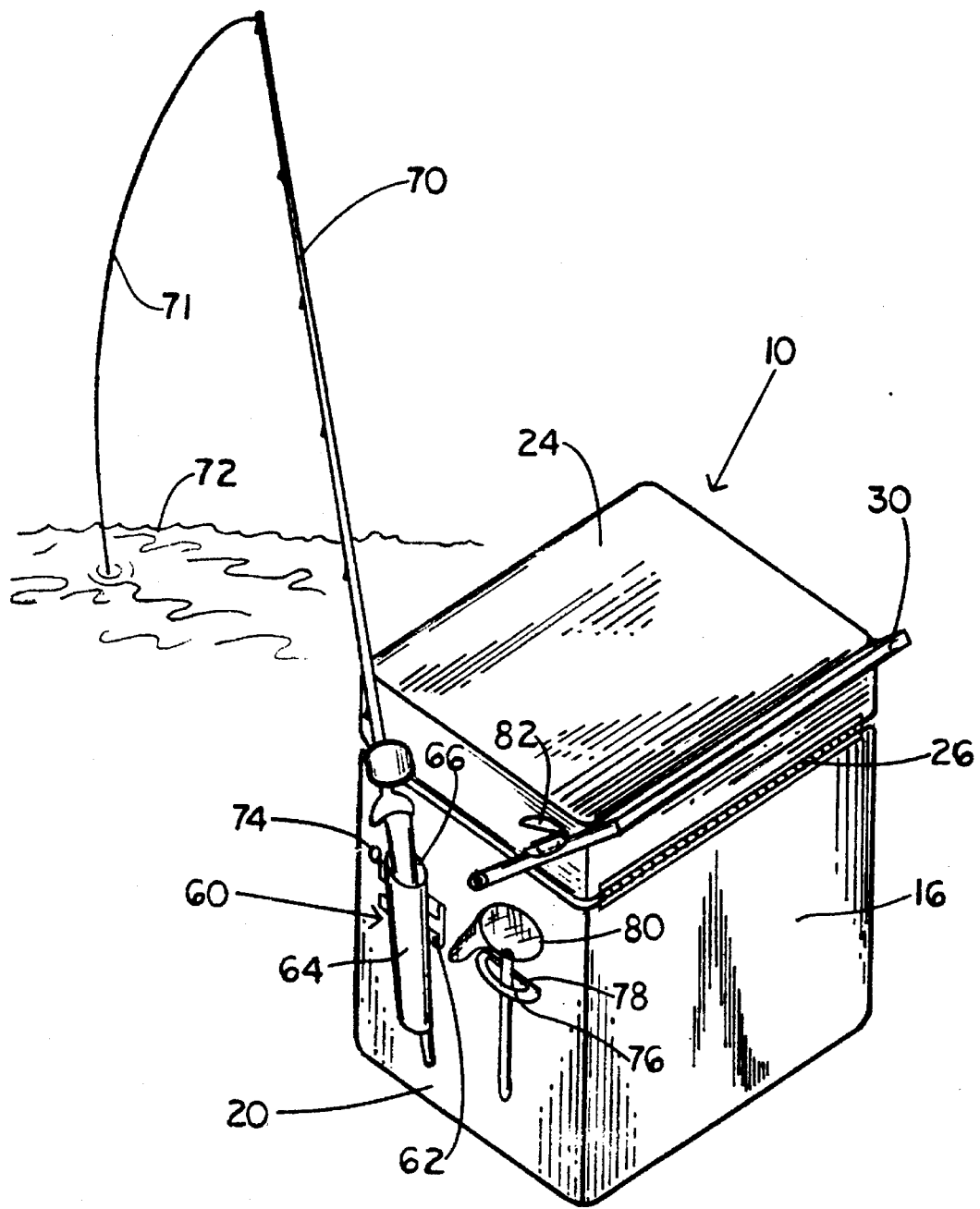
FIG. 3 is a third perspective view illustrating the fishing implement storage apparatus in accordance with the principles of this invention.

Referring to FIG. 3 the fishing implement storage apparatus 10 is also provided with a fishing rod holder, generally designated by the numeral, 60. The rod holder 60 is provided with a planar support member 62 which is coupled to the side member 20 of the chest 12. The rod holder 60 is also provided with an elongated member 64 having opening 66 which extends through the length of the elongated member. The elongated member 64 is coupled to the support member 62. The fishing rod holder 60 is provided to allow a fishing rod 70 to be placed in the opening 66 of the elongated member 64 and thereby maintain the rod in a substantially upright and almost vertical position. This allows the user to maintain the fishing line 71 of the rod 70 in water 72 and continue fishing without having to actually hold the fishing rod. The fishing implement storage apparatus 10 can be provided with a plurality of rod holders 60 if desired.

The fishing implement storage apparatus 10 is also provided with a fishing line stringer 74 which is also coupled to the support member 62 of the rod holder 60.

The fishing implement storage apparatus 10 is also provided with a U shaped support member 76 coupled to the side 20 of the chest 12 having an aperture 78 formed therein. The support member 76 is provided to support a bait net 80 on the side of the chest 12.

The fishing apparatus 10 is also provided with a fishing line cutter 82 which is coupled to the handle 30.

It should be further understood that various changes and notifications can be made without departing from the spirit of the invention as defined in the claims.

What is claimed:

1. A fishing implement storage apparatus including;

a chest, made of a hard plastic, having an open area formed therein, the chest including a pair of spaced side members, a front and back member and a bottom member coupled together to form a rectangular enclosure having the open area formed therein;

a handle pivotably coupled to the chest;

a cover and supporting means pivotably coupled to upper portions of the chest for allowing access to the open area in the chest when pivoted to a first position and for covering the open area in the chest and providing a seat when pivoted to a second position, the cover and supporting means being a lid, made of a hard plastic, pivotably coupled to the back member of the chest and fastenable to the front member thereof;

storage means coupled to an outside lower portion of the chest having an open area and a plurality of individual compartments formed therein;

means for supporting a fishing rod in a substantially upright position to allow fishing when a user is involved in another activity, the fishing rod supporting means including a planar support member coupled to one of the side members of the chest and an elongated member having an opening extending therethrough coupled to the planar support member so that the fishing rod can be inserted in the opening in the elongated member and held in a substantially upright position;

an oxygenating means for gathering and concentrating oxygen from outside the chest and then pumping the oxygen into the chest to oxygenate water in the chest and thereby keep bait alive inside the chest, the oxygenating means including an aerator having a first portion which is coupled to the other side member of the chest, a hose having one end thereof coupled to the first portion and extending into the open area in the chest, and an air dispenser, having apertures formed therein, coupled to the other end of the hose and resting on the bottom member of the chest; and a cutting member coupled to the handle of the chest for cutting fishing line.

2. A fishing implement storage apparatus as defined in claim 1 wherein the storage means includes a lid for covering the open area and the plurality of individual compartments formed therein.

* * * * *